Patented Aug. 4, 1936

2,049,565

UNITED STATES PATENT OFFICE 2,049,565

CELLULOSE DERIVATIVE COMPOSITIONS

Harold S. Holt, Wilmington, Del., assignor to E. I. du Pont de Nemours & Company, Wilmington, Del., a corporation of Delaware No Drawing. Application April 23, 1935, Serial No. 17,771

18 Claims. (Cl. 106—37)

This invention relates to new compositions of matter, more particularly to esters of tetrahydronaphthalenedicarboxylic acids, and still more particularly to coating, plastic, and the like compositions containing cellulose derivatives and these esters.

In copending application Serial No. 751,581, filed November 5, 1934, there is disclosed the preparation of certain esters of tetrahydronaphthalenedicarboxylic acids.

This invention has as an object the preparation of compositions containing cellulose derivatives plasticized by esters of tetrahydronaphthalenedicarboxylic acids or other polycyclic aromatic-alicyclic dicarboxylic acids.

These objects are accomplished by the following invention wherein a cellulose derivative composition is plasticized by means of an ester of a tetrahydronaphthalenedicarboxylic acid or other polycyclic aromatic-alicyclic dicarboxylic acid.

Esters of tetrahydronaphthalenedicarboxylic acids may be made in several ways. Thus, the corresponding ester of a dihydronaphthalenedicarboxylic acid may be hydrogenated to the tetrahydronaphthalenedicarboxylic acid ester. Esters may also be made by reacting a tetrahydronaphthalenedicarboxylic acid or an ester thereof with a volatile alcohol, or the anhydride or chloride of the acid, with a monohydric alcohol. The esters may likewise be made by reacting the sodium salt of the acid with a halide of the monohydric alcohol.

The following examples illustrate certain of the methods of making esters of tetrahydronaphthalenedicarboxylic acids:

*Example 1.—The dimethyl ester of tetrahydronaphthalenedicarboxylic acid*

The preparation of the dimethyl ester of dihydronaphthalenedicarboxylic acid is described in copending application, Serial No. 743,843. The dimethyl esters thus obtained are hydrogenated by subjecting them to a hydrogen pressure of 1,000 to 1,500 lbs./sq. in. in the presence of an activated nickel catalyst at a temperature of 150 to 180° C. The resulting hydrogenated product is a substantially colorless oily liquid having a boiling range of 130 to 195° C. at approximately 2 mm. pressure, a specific gravity of 1.16, a refractive index of 1.5196, and a molecular weight of about 248. It is soluble in all portions in methanol, ethanol, benzene, trichloroethane and cyclohexane. During the hydrogenation it is found that approximately one mol of hydrogen is absorbed per mol of ester used. It is also found that whereas one mol of the original ester will react with bromine to form an addition compound, the hydrogenated ester is substantially unreactive toward bromine at 0° C. in the dark.

*Example 2.—The didodecyl ester of tetrahydronaphthalenedicarboxylic acids*

The didodecyl esters of dihydronaphthalenedicarboxylic acids are prepared by ester interchange between the methyl esters and dodecyl alcohol as described in copending application, Serial No. 743,843. The didodecyl esters thus prepared are hydrogenated under the conditions of Example 1 except that about one-third part by volume of cyclohexane is added as a solvent. The product obtained is a colorless oil which has such a low vapor pressure that it cannot be distilled even in vacuo, below decomposition temperature. It is soluble in absolute alcohol and somewhat soluble in cyclohexane. Its refractive index is 1.488 and it does not react with bromine in the dark at 0° C.

*Example 3.—Dinaphthenyl tetrahydronaphthalenedicarboxylates*

A mixture containing 496 g. of dimethyl ester of tetrahydronaphthalenedicarboxylic acid, 685 g. naphthenyl alcohol (hydroxyl No. 344.5, prepared by hydrogenation of naphthenic acid from petroleum), 500 g. toluene and 25 g. litharge is heated to boiling for 23 hours, the reaction temperature ranging from 140 to 150° C. during this time. The methanol produced is continuously removed at the top of a fractionating column as the toluol-methanol binary. When the theoretical amount of methanol has been removed in this manner, the product is filtered to remove the litharge, 20 g. of carbon added and the product distilled under vacuum to remove toluene and excess alcohol. The product is then steamed and dried under vacuum and filtered hot, yielding a product with a light brown color and medium viscosity.

*Example 4.—Diabietyl tetrahydronaphthalenedicarboxylate*

A mixture containing 124 g. of dimethyl ester of tetrahydronaphthalenedicarboxylic acids, 311 g. abietyl alcohol (hydroxyl No. 180, prepared by sodium reduction of ethyl abietate), 200 g. toluene, 5 g. litharge is refluxed for 18 hours at 145°–198° C. while the methanol produced is continually removed as the toluol-methanol binary at the top of the fractionating column. The product is filtered hot, 5 g. of carbon added and refluxed for 2 hours and again filtered to remove colloidal litharge. The product is then refined in a manner similar to that described in Example 3.

The esters prepared as above described vary in physical properties from substantially colorless oily liquids to very viscous liquids which probably should be crystalline. They are extremely high boiling and are quite compatible with cellulose derivatives.

The methyl ester in particular is very satisfactorily compatible with cellulose acetate as are also the methyl glycollate and the methoxyethyl esters, and even more compatible with cellulose esters of other organic acids, cellulose nitrate, and cellulose ethers. The esters of higher alcohols such as butyl are compatible in more limited amounts. With cellulose nitrate and cellulose ethers the esters are in general compatible in large amounts. These esters are readily soluble in all of the common organic solvents and are miscible with other materials commonly used as plasticizers. They are in general, tho not perhaps in all cases, compatible with the various natural and synthetic resins such as polyvinyl acetate, polymerized methyl methacrylate, polystyrene, polyhydric alcohol polybasic acid resins, phenol-aldehyde resins, modified phenol-aldehyde resins such as Amberol and Beckacite, ether resins, and many natural resins such as damar.

Monohydric alcohols in general may be used to esterify tetrahydronaphthalenedicarboxylic acids or to esterify the dihydronaphthalenedicarboxylic acids which are then hydrogenated as esters to esters of the tetrahydronaphthalenedicarboxylic acids. Aliphatic alcohols from methyl to octadecyl including the branched chain primary and secondary alcohols containing six to eight or even more carbon atoms obtained by the catalytic hydrogenation of carbon oxides at elevated temperatures and pressures, aromatic alcohols such as benzyl alcohol and substituted benzyl alcohols, alicyclic alcohols such as cyclohexanol, substituted cyclohexanols and cyclohexyl substituted alkanols as well as the naphthenyl alcohols obtained by the hydrogenation of naphthenic acids, ether alcohols such as tetrahydrofurfuryl alcohol and the monoalkyl ethers of ethylene, propylene and diethylene glycols such as methoxyethanol, ethoxyethanol, butoxyethoxyethanol, and dialkyl ethers of glycerol, and ester alcohols such as glycol monoacetate, methoxyethyl glycollate, methyl glycollate, etc., may be employed. Useful esters may also be made from the mixture of alcohols obtainable by the carboxyl hydrogenation of coconut oils.

As has been indicated above, these esters are of considerable utility as plasticizers for cellulose derivative coating compositions, which utility is exemplified in the following examples:

Example 5

| | Parts |
|---|---|
| Cellulose nitrate | 12 |
| Damar | 3 |
| Dibutyl tetrahydronaphthalenedicarboxylate | 4 |
| Castor oil | 2.6 |
| Solvent | 166 |

Example 6

| | Parts |
|---|---|
| Cellulose isobutyrate | 10 |
| Diethyl tetrahydronaphthalenedicarboxylate | 3 |
| Solvent | 100 |

Example 7

| | Parts |
|---|---|
| Cellulose acetate | 12 |
| Dimethoxyethyl tetrahydronaphthalenedicarboxylate | 6 |
| Solvent | 182 |

Example 8

| | Parts |
|---|---|
| Ethyl cellulose | 10 |
| Resin | 6 |
| Dicyclohexyl tetrahydronaphthalenedicarboxylate | 6 |
| Paraffin wax | 2 |
| Solvent | 170 |

Example 9

| | Parts |
|---|---|
| Cellulose acetobutyrate | 10 |
| Dicarbomethoxymethyl tetrahydronaphthalenedicarboxylate | 4 |
| China wood oil | 6 |
| Solvent | 20 |

Example 10

| | Parts |
|---|---|
| Cellulose nitrate | 10 |
| Didodecyl tetrahydronaphthalenedicarboxylate | 12 |
| Pigment | 10 |
| Solvent | 50 |

The above lacquers give films which dry in a few minutes and which are tough, flexible and very durable. By the term "solvent" in the above examples is meant a suitable mixture of esters, alcohols and hydrocarbons such as is already well known to those skilled in the art.

These esters are also of value as plasticizers in plastic compositions such as those exemplified below:

Example 11

| | Parts |
|---|---|
| Cellulose acetate | 100 |
| Dimethyl tetrahydronaphthalenedicarboxylate | 75 |

Example 12

| | Parts |
|---|---|
| Cellulose nitrate | 100 |
| Dibutyl tetrahydronaphthalenedicarboxylate | 50 |
| Pigment (including color) | 200 |

Example 13

| | Parts |
|---|---|
| Ethyl cellulose | 100 |
| Carbomethoxymethyl methyl tetrahydronaphthalenedicarboxylate | 15 |

Example 14

| | Parts |
|---|---|
| Cellulose laurate | 100 |
| Dibutyl tetrahydronaphthalenedicarboxylate | 20 |

The above plastic compositions may be prepared with or without the usual volatile solvent, for example, alcohol for the cellulose nitrate compositions, acetone for the cellulose acetate compositions, and toluol-alcohol mixture for the cellulose ether compositions. Other cellulose derivatives such as cellulose propionate, cellulose butyrate, cellulose acetobutyrate, benzyl cellulose, glycol cellulose, cellulose glycollic acid, etc., may be substituted for the cellulose derivatives given in the examples. Any part of the plasticizer in the above examples may be replaced by other plasticizers of the group included within the scope of the present invention, or in part by one or more of the plasticizers hitherto known to the art including triacetin, camphor, dibutyl phthalate, tricresyl phosphate, dimethoxyethyl phthalate, ethyl p-toluenesulfonamide, etc.

While certain proportions of the plasticizer have been given, it is to be noted that the ratio of plasticizer to cellulose derivative may be varied, the plasticizer being used in amounts of 5, 10, 20, 30, 40, 50, 60, 70, 80, 90, 100 or even up to 150 or 200 parts per 100 parts of cellulose derivative being modified, particularly with cellulose nitrate, cellulose ethers and cellulose esters of higher organic acids.

The methods described above for the preparation of the esters of the present invention are capable of considerable variation. Furthermore, while the invention has been disclosed in the terms of esters of tetrahydronaphthalenedicarboxylic acids, esters of polycyclic aromatic-alicyclic dicarboxylic acids, i. e., esters containing an aromatic ring and a fully hydrogenated aromatic ring on which hydroaromatic rings are situated two carboxyl groups are generally of use in cellulose derivative compositions, and the invention therefore includes such compositions within its scope. These esters include the esters of the hexahydrodiphenyl, tetrahydroanthracene, and tetrahydrophenanthrenedicarboxylic a c i d s. These esters may be prepared by the hydrogenation of the esters of dihydrodiphenyl-, dihydroanthracene-, and dihydrophenanthrenedicarboxylic acids. The esters may be prepared from the sodium addition compounds of the corresponding aromatic hydrocarbons by the method set forth in copending application Serial No. 638,524.

The esters of the acids containing a fully hydrogenated hydroaromatic ring are even more satisfactory for general use as plasticizers than the corresponding dihydronaphthalene derivatives because of their increased color stability and stability towards oxidizing agents.

Cellulose derivative compositions of the present invention may be used in the preparation of lacquers and varnishes for coating metal and wood, dopes for coating fabrics, lacquers for coating regenerated cellulose sheeting, plastic compositions useful in the preparation of toiletware, novelties, sheeting, rods, tubing, safety glass interlayers, and lacquers for coating wire screen, and in the preparation of thin transparent sheets for wrapping purposes. Among the examples given above are those illustrating a type of composition suitable for each of these uses.

The high boiling water resistant plasticizers of the present invention are highly compatible with cellulose derivatives and may also be used with natural and synthetic resins and oils. Because of the low vapor pressure of the plasticizer the cellulose derivative plastics containing them are permanently flexible and have good durability, and for example, are more advantageous than corresponding phthalates.

The above description and examples are intended to be illustrative only. Any modification of or variation therefrom which conforms to the spirit of the invention is intended to be included within the scope of the claims.

I claim:
1. A new composition of matter comprising cellulose acetate, and as a plasticizer therefor, a dimethyl tetrahydronaphthalenedicarboxylate.
2. A new composition of matter comprising a cellulose ester, and as a plasticizer therefor, a dimethyl tetrahydronaphthalenedicarboxylate.
3. A new composition of matter comprising a cellulose derivative, and as a plasticizer therefor, a dimethyl tetrahydronaphthalenedicarboxylate.
4. A new composition of matter comprising cellulose nitrate, and as a plasticizer therefor, a didodecyl tetrahydronaphthalenedicarboxylate.
5. A new composition of matter comprising a cellulose ester, and as a plasticizer therefor, a didodecyl tetrahydronaphthalenedicarboxylate.
6. A new composition of matter comprising a cellulose derivative, and as a plasticizer therefor, a didodecyl tetrahydronaphthalenedicarboxylate.
7. A new composition of matter comprising cellulose nitrate, and as a plasticizer therefor, a neutral ester of a tetrahydronaphthalenedicarboxylic acid with the mixture of alcohols obtainable by the carboxyl reduction of the fatty acids of coconut oil.
8. A new composition of matter comprising a cellulose ester, and as a plasticizer therefor, a neutral ester of a tetrahydronaphthalenedicarboxylic acid with the mixture of alcohols obtainable by the carboxyl reduction of the fatty acids of coconut oil.
9. A new composition of matter comprising a cellulose derivative, and as a plasticizer therefor, a neutral ester of a tetrahydronaphthalenedicarboxylic acid with the mixture of alcohols obtainable by the carboxyl reduction of the fatty acids of coconut oil.
10. A new composition of matter comprising cellulose nitrate, and as a plasticizer therefor, a dialkyl tetrahydronaphthalenedicarboxylate.
11. A new composition of matter comprising a cellulose ester, and as a plasticizer therefor, a dialkyl tetrahydronaphthalenedicarboxylate.
12. A new composition of matter comprising a cellulose derivative, and as a plasticizer therefor, a dialkyl tetrahydronaphthalenedicarboxylate.
13. A cellulose derivative composition containing, as a plasticizer therefor, a neutral ester of a tetrahydronaphthalenedicarboxylic acid.
14. A cellulose derivative composition containing, as a plasticizer therefor, an ester of a tetrahydronaphthalenedicarboxylic acid.
15. A cellulose derivative composition containing, as a plasticizer therefor, a neutral ester of a polycyclic dicarboxylic acid containing at least one aromatic ring, and a fully hydrogenated aromatic ring on which hydroaromatic ring are situated two carboxyl groups.
16. A cellulose derivative composition containing, as a plasticizer therefor, an ester of a polycyclic dicarboxylic acid containing at least one aromatic ring, and a fully hydrogenated aromatic ring on which hydroaromatic ring are situated two carboxyl groups.
17. A cellulose derivative composition containing, as a plasticizer therefor, a neutral ester of a polycyclic dicarboxylic acid of the class consisting of tetrahydronaphthalenedicarboxylic, hexahydrodiphenyldicarboxylic, tetrahydroanthracenedicarboxylic and tetrahydrophenanthrenedicarboxylic acids.
18. A cellulose derivative composition containing, as a plasticizer therefor, an ester of a polycyclic dicarboxylic acid of the class consisting of tetrahydronaphthalenedicarboxylic, hexahydrodiphenyldicarboxylic, tetrahydroanthracenedicarboxylic and tetrahydrophenanthrenedicarboxylic acids.

HAROLD S. HOLT.